United States Patent [19]

Barrentine et al.

[11] 4,139,230
[45] Feb. 13, 1979

[54] WAGON BODY FOR TRANSPORTING SEED COTTON AND THE LIKE

[76] Inventors: Thomas A. Barrentine, R.F.D. #1, Box 6; Benjamin F. Barrentine, R.F.D. #2, Box 114; Reed B. Alford, 610 Cherokee Dr., all of Greenwood, Miss. 38930

[21] Appl. No.: 813,438

[22] Filed: Jul. 7, 1977

[51] Int. Cl.² .............................................. B62D 33/08
[52] U.S. Cl. ......................................... 296/26; 296/7; 296/14; 296/15
[58] Field of Search ...................... 296/7, 15, 23 F, 26, 296/27, 28 E

[56] References Cited
U.S. PATENT DOCUMENTS 1,238,180  8/1917  Netherland ............................... 296/7
3,572,812  3/1971  Norcia ..................................... 296/26

*Primary Examiner*—Richard A. Bertsch
*Attorney, Agent, or Firm*—Hugh P. Carter

[57] ABSTRACT

A wagon body adapted to receive and transport seed cotton and the like and which has an elongated deck and upstanding end and side walls, the side walls being pivotally arranged for the upper portions thereof to move toward and away from each other. With the walls in spread apart position the wagon is loaded with cotton whereupon the side walls are moved inwardly, thus to compress the cotton. The side walls are power driven by means of an elongated torsion member which extends from end to end of the body and a plurality of links operatively connected between the torsion member and the side walls.

4 Claims, 8 Drawing Figures

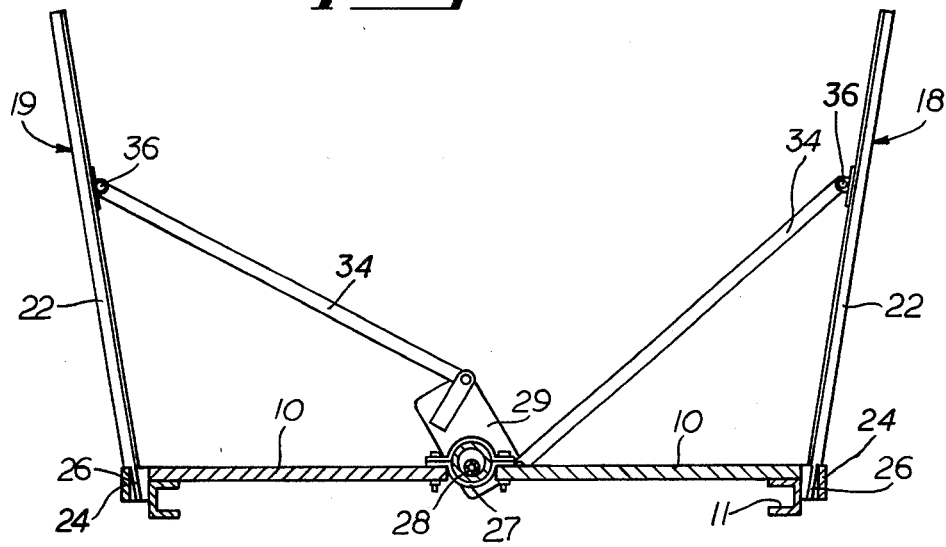
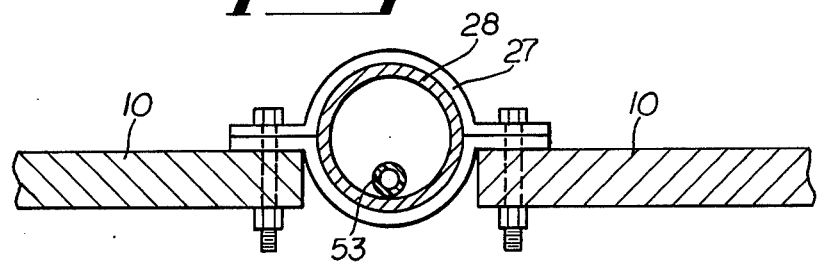
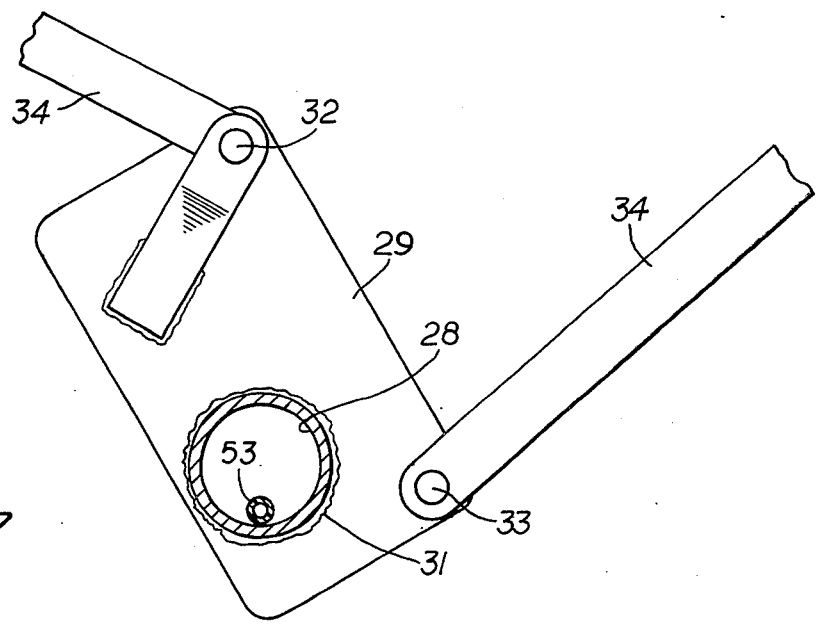

WAGON BODY FOR TRANSPORTING SEED COTTON AND THE LIKE

This invention relates to an improved wagon body for transporting seed cotton and the like from the field to the gin or to othewise as desired.

In the art to which this invention relates it is customary for mechanical cotton pickers to load the same directly into wagons for transport to the gin or to a module forming apparatus. These cotton pickers have a hopper which may be elevated and tipped to a dumping position. With present-day wagons having vertically arranged sides, at the time of dumping some of the cotton usually spills on the ground and must be picked up by hand. Furthermore, it is desirable to increase the capacity of the wagon by compressing the cotton to some extent.

With the foregoing in mind an object of our invention is to provide an improved wagon body for seed cotton and the like which comprises a deck, there being rear and front walls on the deck and side walls pivotally connected to the deck at their lower extremities, together with means to tilt the walls outwardly, thus to increase the volumetric capacity of the wagon while cotton is being loaded thereinto.

A more specific object is to provide means for operating the side walls which comprises a torsion member extending substantially the length of the body, generally along the longitudinal axis of the deck, together with means to attach operating links to the torsion member and to the side walls.

A further object is to provide a cotton wagon of the kind indicated in which the aforesaid elongated torsion member is powered by front and rear fluid pressure cylinders, the fluid supplied to and removed from the rearmost cylinder being conveyed in a conduit which is inside the torsion member, thus completely enclosing such fluid pressure conduit, simlifying the apparatus and increasing its efficiency and longevity.

A more detailed object is to provide a double-acting fluid pressure cylinder located at the front of the wagon body and a single acting cylinder located at the rear of the body boty of which are operatively connected to the torsion member.

A cotton wagon illustrating features of our invention is shown in the accompanying drawings in which:

FIG. 5 is a detail sectional view taken generally along line 5—5 of FIG. 2;

FIG. 6 is a fragmental detail sectional view taken generally along line 6—6 of FIG. 2;

FIG. 7 is an enlarged detail fragmental view through the torsion member and one of the link plates connected thereto, the view being taken generally along line 7—7 of FIG. 2; and, FIG. 8 is a schematic diagram of the hydraulic system.

Figure 1:
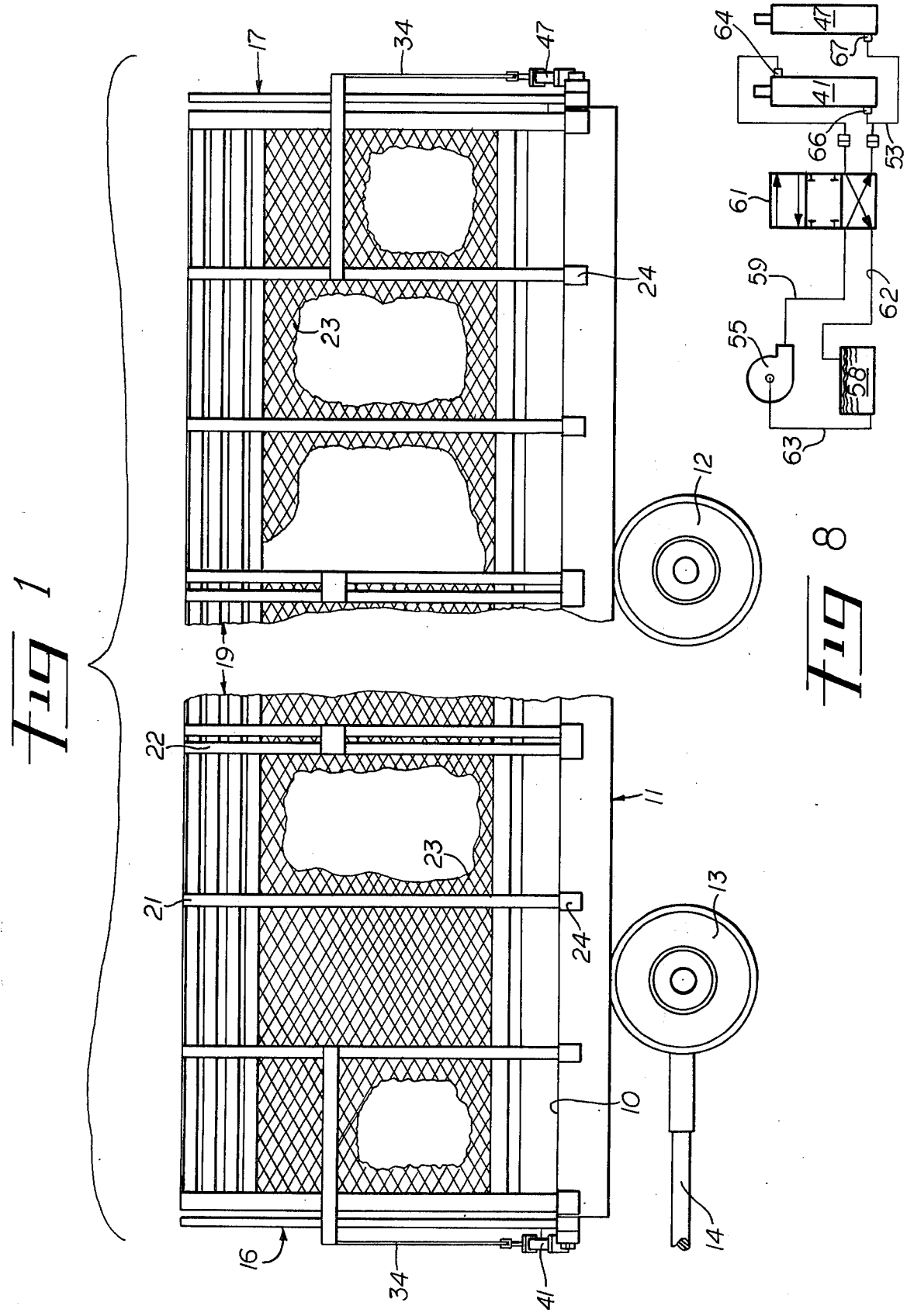
FIG. 1 is a side elevational view of our improved wagon body, certain parts being broken away.
Figure 2:
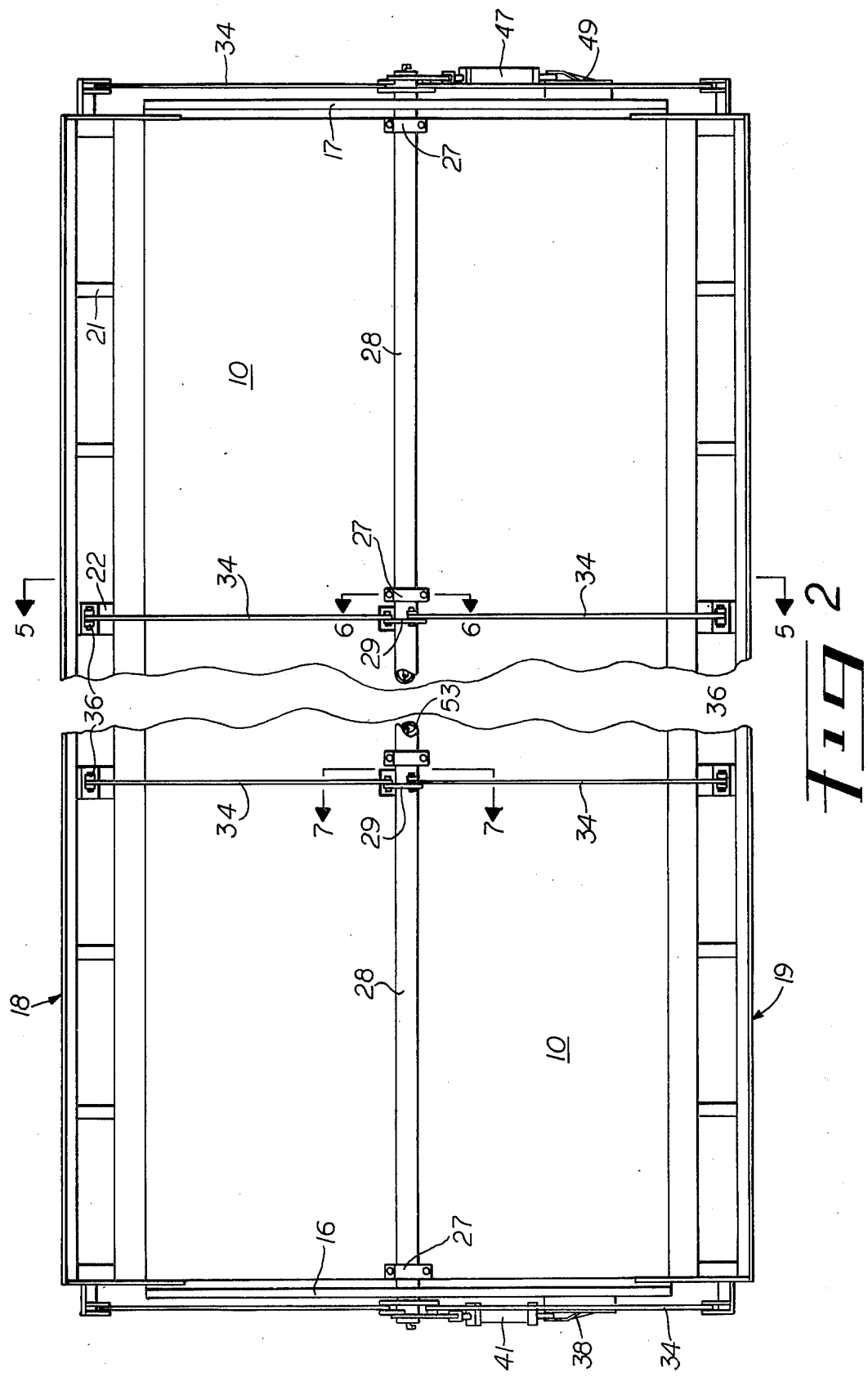
FIG. 2 is a plan view partly broken away and showing the position of the parts with the wagon body sides moved to a full open position.

Referring now to the drawings for a better understanding of our invention we show our improved cotton wagon as embodying a deck 10 which may be of wooden boards or the like. The deck is supported on longitudinally and transversely extending channel-like frame members indicated at 11. The vehicle may be equipped with rear supporting wheels 12 and front supporting wheels 13, the latter being steerable through the usual tongue-draw bar arrangement indicated at 14 and which may be attached to a towing vehicle, not shown.

The body also is provided with a fixed front end wall indicated generally by the numeral 16 and a fixed rear wall indicated generally the numeral 17. By "fixed" we means that these walls 16 and 17 are not tiltable or movable outwardly relative to the deck 10.

The side walls 18 and 19 may be fabricated from a plurality of vertically arranged members 21, some of which may be doubled as indicated at 22 for strength, these members supporting expanded metal 23, thus to form the sides.

Secured along the outer sides of the frame members 11 are pockets 24. Received in the pockets 24 are the lower ends 26 of the vertical members 21 of the side walls 18 and 19. This arrangement is such that the side walls 18 and 19 in effect are pivotally connected to the deck section of the body for movement from the position indicated in the drawings to a true vertical position as presently will be explained.

Mounted in suitable strap bearings 27 provided at intervals in the deck 10 is a torsion member 28 which may be in the form of a tube. As shown in the drawings the memeber 28 extends the full length of the body and in fact projects beyond the end walls 16 and 17. The torsion member 28 is provided at intervals with link plates 29 which are secured to the torsion member 28 by welding as indicated at 31.

Pivotally mounted as at 32 and 33 to the plates 29 are links 34. These links 34 in turn are pivotally mounted as at 36 to the respective side walls 18 and 19.

Pivotally connected at 37 to a bracket member 38 carried by a transverse memeber of the frame 11 is a double-acting fluid pressure cylinder indicated at 41. The piston rod 42 of the cylinder 41 is pivotally connected at 43 to another plate 44 securely welded to the torsion member 28. It will be noted that forwardly of the front wall 16 there is an additional one of the plates 29 and additional ones of the links 34, the upper ends of which links are pivotally connected at 46 to the respective walls 18 and 19.

The cylinder 41 is double-acting and as will later appear fluid may be admitted into either end of the same.

Figure 4:
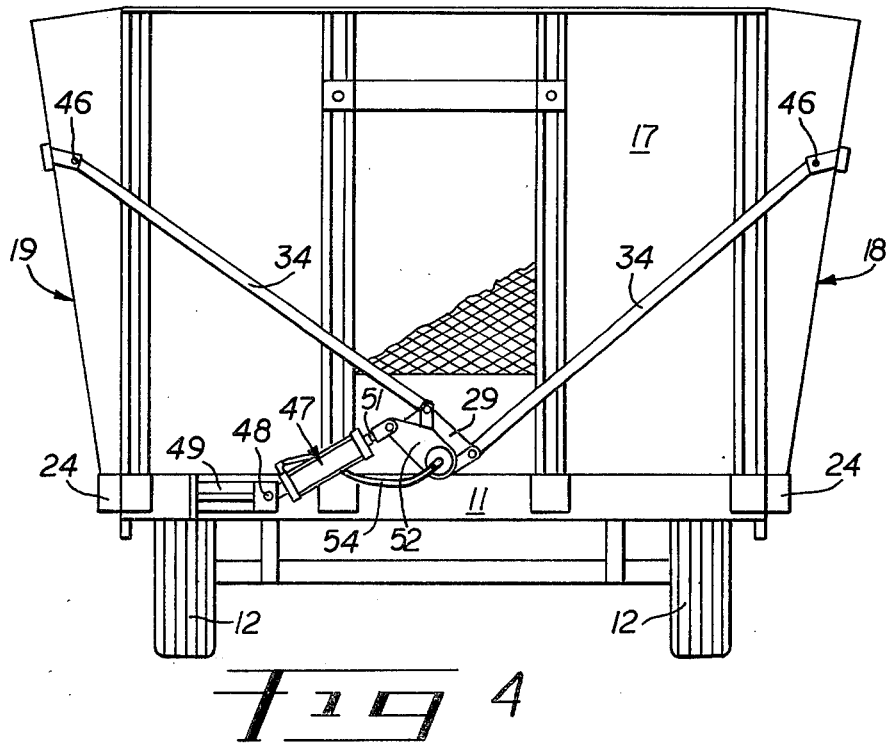
FIG. 4 is a rear elevational view also with the sides in open position.

Referring now particularly to FIG. 4, we show a second cylinder 47 pivotally connected at 48 to a bracket member 49 mounted on the rear transverse portion of the frame 11. The piston rod 51 of the cylinder 47 is pivotally connected to a plate 52 securely welded to the torsion member 28. Additional links 34 are connected to one of the plates 29 rearwardly of the wall 17. The upper ends of these links are pivotally connected at 46 to the respective walls 18 and 19.

The cylinder 47 is single acting only. Fluid under pressure and return fluid for the cylinder 48 may be supplied by means of a conduit 53 which simply may be a pipe, hose or the like carried insdie the torsion member 28. At the rear this member 53 is connected by a flexible hose 54 to the lower end of the cylinder 47 as shown in FIG. 4.

Figure 3:
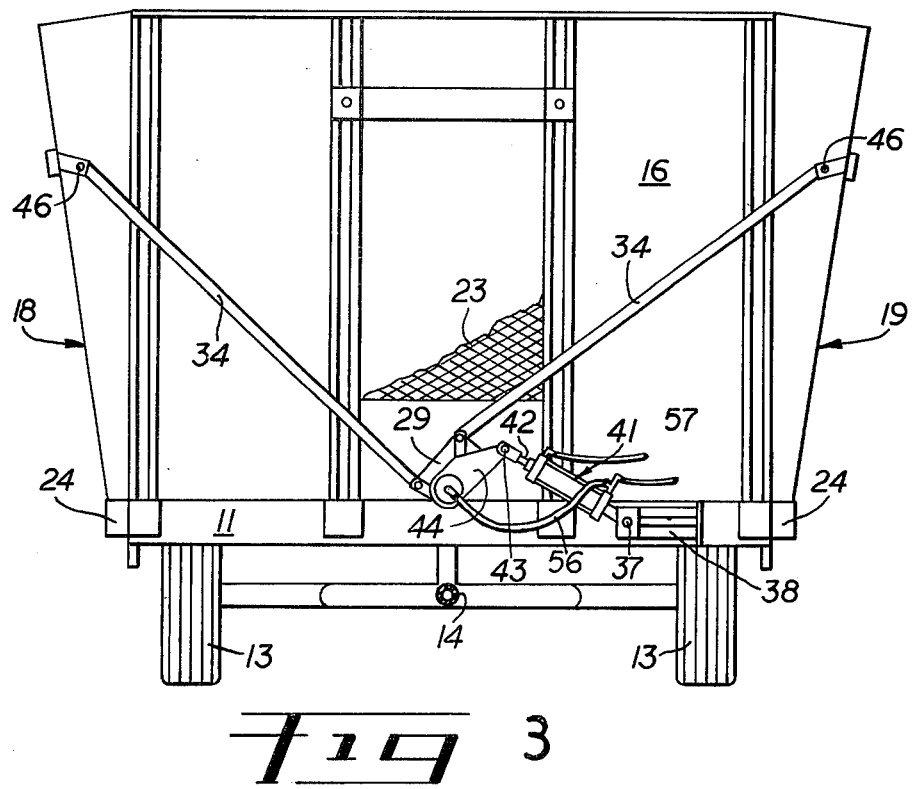
FIG. 3 is a front elevational view with the sides in open position.

Referring again to FIG. 3 fluid is supplied to and removed from the conduit 53 and hence the cylinder 47 through a flexible hose 56 which is connected to a fitting 57 carried by the cylinder 41, or adjacent the same.

Referring now to the schematic drawing, FIG. 8, we show a pump 55 and a reservoir 58 which conveniently may be carried on a towing vehicle, not shown. The pump 55 may be a hydraulic pump and the same may supply hydraulic oil under pressure through a line 59 to a control valve 61. A return line 62 is indicated as leading from the valve back to the reservoir.

The valve 61 is capable of connecting the pressure line 59 either to the top pressure connection 64 of cylinder 41 or to the bottom pressure connection 66 thereof. Whenever fluid under pressure is being supplied to the bottom of cylinder 41 fluid under pressure is also being supplied through the conduits 56, 53 and 54 to the bottom pressure connection 67 of cylinder 47. In somewhat similar manner, when the valve is moved to a position to supply fluid under pressure to the connection 64 the connections 66 and 67 of the two cylinders are connected to return the fluid through the line 62 to the reservoir.

With the foregoing in mind it is now possible more fully to explain the construction, function and advantages of our improvded cotton wagon. As stated, when it is desired to load the wagon with cotton the cylinders are actuated to oscillate the torsion member to the position shown in the several FIGS. of the drawings, namely, so that the walls 18 and 19 are moved outwardly at their upper ends relative to the deck 10. When the wagpon is fully loaded with the relatively loose cotton the torsion member is energized by means of the cylinders to move the walls again to vertical position, this being accomplished of course, through the links 34.

It will be noted that the double-acting cylinder 41 is at the front of the vehicle, namely, the end of the vehicle from which the fluid under pressure will be supplied to the system, preferably by a pump, reservoir, etc. carried by the towing vehicle. Thus, on the cycle of the apparatus wherein the walls are moved from open to fully vertical position, both of the cylinders 41 and 47 are energized to aid in this movement, thus affording more power for packing the cotton. On the other hand, when the walls move from vertical position to their outermost position only the cylinder 41 is needed. This arrangement eliminates the need for two double-acting cylinders, consequently eliminating the need for two lines to run from the front or fluid under pressure receiving end to the rear end. This permits a great economy in the hydraulic system while at the same time in no way affecting the capability of the body to compress the cotton to a desired degree.

As before stated, by tilting the walls outwardly it has been found that the cotton picker comes more nearly dumping its full load into the wagon, without spillage, over what is the case when a wagon with vertical side walls is filled by such cotton pickers. By compacting the cotton the capacity of the wagon is increased.

While we have shown our invention in but one form, it will be obvious to those skilled in the art that it is not so limited, but is susceptible of various changes and modifications without departing from the spirit thereof.

What we claim is:

1. In a wagon body of the kind having sides mounted alongside a deck and provided with means permitting the upper edges of the sides to move outwardly, thereby to increase the volumetric capacity of the body for loading, the improvement comprising:
    (a) an elongated, hollow, tube-like torsion member extending substantially the length of the deck generally co-incident with the longitudinal center line of the body and supported thereon for oscillation;
    (b) a plurality of links each having one end operatively connected to the body sides and the other end operatively connected to the torsion member in offset relation to the longitudinal axis of the torsion member,
    (c) fluid pressure cylinders operatively connected to each end of the torsion member to oscillate the torsion member, thereby to move the upper edges of said body sides from outward positons to inward positions, and
    (d) a conduit for fluid under pressure for one of the fluid pressure cylinders extending through the torsion member, whereby fluid under pressure may be supplied substantially simultaneously to both cylinders from one end of the wagon body.

2. In a wagon body espcially adapted to receive and transport seed cotton and the like,
    (a) an elongated load-supporting deck,
    (b) front and rear end walls for the deck,
    (c) side walls for the deck pivotally arranged for the upper edges thereof to move apart, thereby to increase the volumetric capacity of the body while it is being loaded,
    (d) an oscillatably mounted torsion member extending the length of the body and located adjacent the upper surface of the deck,
    (e) front, rear and intermediate links each having one end pivotally connected to the sides at points above the level of the deck,
    (f) the upper ends of each of said links being operatively connected to the torsion member in offset relation to the longtudinal axis thereof,
    (g) front and rear fluid pressure cylinders pivotally connected to the body and having piston rods operatively connected to oscillate the torsion member, and
    (h) means to supply fluid under pressure from the front of the body simultaneously to the cylinders, whereby the upper edges of the sides may be moved from an apart position to a substantially vertical position.

3. The wagon body of claim 2 in which one of the fluid pressure cylinders is double acting and the other is single acting.

4. The wagon body of claim 3 in which the double acting cylinder is located at the front of the body.

* * * * *